Jan. 1, 1952 W. A. MILLER 2,581,273

CIRCUITS EMPLOYING GERMANIUM DIODES AS ACTIVE ELEMENTS

Filed Dec. 6, 1947

INVENTOR
WILLIAM A. MILLER
BY Harry Lunick
ATTORNEY

Patented Jan. 1, 1952

2,581,273

UNITED STATES PATENT OFFICE 2,581,273

CIRCUITS EMPLOYING GERMANIUM DIODES AS ACTIVE ELEMENTS

William A. Miller, Port Jefferson, N. Y., assignor to Radio Corporation of America, a corporation of Delaware Application December 6, 1947, Serial No. 790,199

6 Claims. (Cl. 250—36)

This invention relates to novel electrical circuits for producing the negative alternating current resistance phenomenon.

Generally stated, a device may be said to produce the phenomenon of negative alternating current resistance when an increase in the current flowing through the device is accompanied by a decrease in the voltage drop across the device. Common examples of devices presenting a negative A.-C. resistance are the oscillating (Poulsen) arc and certain vacuum tube oscillators.

The present invention has for one of its objects to obtain the negative A. C. resistance phenomenon by a circuit which eliminates the need for vacuum tubes and which is rugged and relatively inexpensive to construct.

Another object is to employ a germanium diode as a negative resistance device in an electrical circuit.

A further object is to provide a multivibrator circuit employing a pair of germanium diodes operating as negative A. C. resistance devices.

Figure 1A:
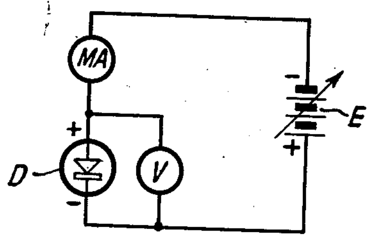
Figure 1B:
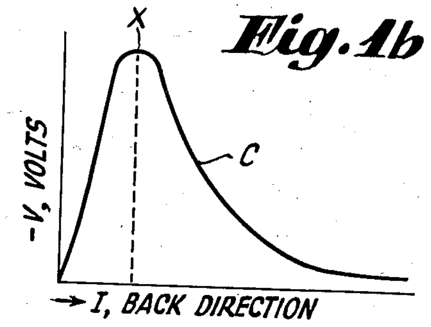
Figure 2:
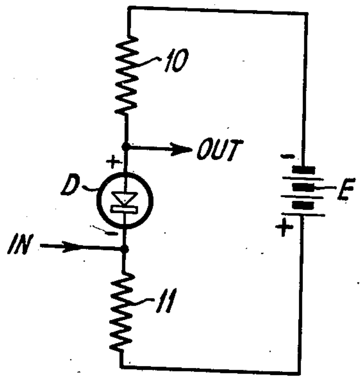
Figure 3:
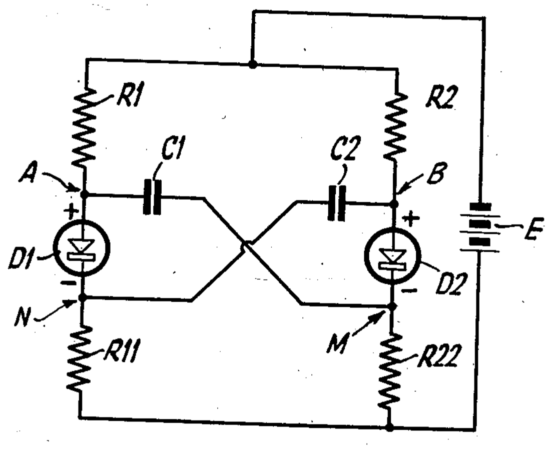

A better understanding of the invention may be had by referring to the following description in conjunction with a drawing, wherein:

Fig. 1*a* is a circuit diagrammatically illustrating how a germanium diode may be connected to exhibit the negative resistance characteristic;

Fig. 1*b* is a curve showing the voltage-current characteristic of the germanium diode when connected as a negative resistance device;

Fig. 2 illustrates one circuit embodiment of the invention making use of the germanium diode as a negative resistance device; and Fig. 3 illustrates another circuit embodiment of the invention making use of a pair of germanium diodes in a multivibrator circuit.

As is well known, a germanium diode is made from a whisker (wire element), such as tungsten, contacting a crystal of germanium, both enclosed in a suitable insulating material. The whisker terminal is customarily labeled + (plus), while the germanium crystal terminal is labeled — (minus) in the germanium diodes commercially available.

Fig. 1*a* illustrates how a germanium diode can be connected to exhibit the negative resistance characteristic. The germanium diode is indicated by reference character D and is connected between the terminals of a variable battery E. The negative terminal of variable battery E is connected to the + terminal of diode D through a milliammeter MA, while the positive terminal of battery E is connected to the — terminal of diode D. A voltmeter V is connected across the diode. By varying battery E, the relationship between the current I flowing through the diode and indicated on the meter MA, and the voltage drop V across the diode, indicated on the voltmeter V, will be as shown in the curve C of Fig. 1*b* wherein current I is the abscissa and voltage drop V is the ordinate. An inspection of Fig. 1*b* shows that for currents greater than that corresponding to value X on the abscissa I, the germanium diode has a negative A.-C. resistance. Thus, as the current is increased beyond point X, the voltage drop across the diode V will decrease.

Fig. 2 shows an embodiment of the invention wherein use is made of the negative A.-C. resistance characteristic of the germanium diode in an amplifier circuit having a nonlinear characteristic. The battery E is connected across the germanium diode D in the same manner as shown in Fig. 1*a* but through resistors 10 and 11. The value of E is adjusted or chosen so that the diode D operates beyond point X on the curve C of Fig. 1*b*, or stated otherwise, on the portion of curve C having negative slope. In this condition, a voltage applied to input terminal In will appear amplified at the output terminal Out but considerably distorted. The harmonic content at the output terminal Out will be high and be a mixture of odd and even harmonics.

Fig. 3 illustrates a multivibrator circuit employing two germanium diodes D1 and D2 operating as negative A.-C. resistance devices. In Fig. 3, diode D1 is connected through resistors R1 and R11 to the negative and positive sides respectively, of source E. Similarly, diode D2 is connected through resistors R2 and R22 respectively, to the negative and positive sides of battery E. The + (plus) terminal A of diode D1 is connected through coupling condenser C1 to the — (minus) terminal M of diode D2. The + (plus) terminal B of diode D2 is connected through the coupling condenser C2 to the — (minus) terminal N of diode D1. Here again, as in Fig. 2, the components are so adjusted or chosen that the diodes operate on the down slope of the curve C. Battery E has a value sufficiently large to cause this result. The two diodes D1 and D2 are thus cross-coupled to provide regenerative feedback, and operate as non-linear amplifiers in the multivibrator circuit.

Due to the fact that the two diodes D1 and D2 are not identical because of unavoidable differences during the process of manufacture, one diode will conduct before the other. Let it be assumed that D1 conducts first when connected in the system of Fig. 3. When diode D1 conducts, the voltage at terminal A goes relatively more positive (D1 resistance decreases). The condenser C1 couples the resulting positive pulse to the terminal M which is the high potential side of resistor R22, thus preventing diode D2 from conducting until condenser C1 discharges through its discharge path which includes elements D1 and R11 on one side of terminal A and resistor R1 on the other side of terminal A. When the condenser C1 discharges to a value which permits terminal M to go sufficiently negative to allow diode D2 to conduct, this diode D2 will conduct and cause terminal B to go more positive, as a result of which the resistance of diode D1 is increased to a high value and ceases conducting. This occurs because the raising of the positive potential on terminal B causes a positive pulse to be applied through condenser C2 to terminal N, thus making terminal N go more positive. This cycle of operations repeats itself at a rate determined by the values of condensers C1 and C2 and the resistance of the discharge paths of the condensers.

The value of battery E is determined by the fact that the diodes must swing from the right of point X to the neighborhood of X for the high resistance ("cut-off") condition and considerably to the right of point X for the low resistance ("on") condition of the diodes.

Output from the multivibrator may be taken from any one of points A, B, M or N, or any two of these points, provided that the output circuit into which the multivibrator works has a high impedance in order not to interfere with the charge-discharge cycle of condensers C1 and C2. The output is a wave which is approximately square at the low frequencies of 1 to 3 cycles per second.

In one embodiment of the multivibrator of Fig. 3 successfully tried out, resistors R1, R2, R11 and R22 were equal in value and each 1000 ohms. With fixed values of R1, R11, R2 and R22, and by varying the values of C1 and C2, the multivibrator operated to produce oscillations at frequencies from 1 to 5000 cycles per second.

What is claimed is:

1. A multivibrator comprising two circuit branches arranged electrically in parallel, each branch including in the order named, a resistor, a germanium diode and another resistor, a source of unidirectional potential connected across said circuit branches, the diodes of said branches being similarly arranged relative to said source, and a pair of condensers cross-coupling the terminals of said germanium diodes, said source being so coupled to said diodes and having such a value that both diodes exhibit negative resistance characteristics and operate in the negative resistance region of their characteristic curves.

2. A multivibrator system comprising two circuit branches arranged electrically in parallel relation, each circuit branch including a pair of impedances capable of passing direct current and a germanium diode located between and in series with said impedances, a source of unidirectional potential having its positive terminal connected to those ends of both branches which are connected to the germanium layer side of the diodes, and its negative terminal connected to the other ends of said branches, the value of said source being such that both diodes exhibit negative resistance characteristics and operate in the negative resistance regions of their characteristic curves, a capacitor coupling one side of the diode in one branch with the noncorresponding side of the diode in the other branch, and another capacitor coupling the other sides of the diodes in said branches.

3. A multivibrator system comprising two circuit branches arranged in electrically parallel relationship, each circuit branch including a pair of impedances capable of passing direct current and a two-element device located between and in series with said impedances, said devices being capable of exhibiting negative resistance characteristics, a source of uni-directional potential connected across said circuit branches, said devices being similarly arranged relative to said source, a pair of condensers cross-coupling opposite terminals of said devices, said source being so coupled to said devices and having such a value that both devices exhibit negative resistance characteristics and operate as amplifiers in the negative resistance regions of their characteristic curves.

4. A multivibrator circuit arrangement including a series circuit comprising an impedance element capable of passing direct current, a two-terminal uni-directional nonlinear impedance device and a further impedance element capable of passing direct current, means to apply direct operating potential across said series circuit of value at which said two-terminal device exhibits a negative resistance characteristic, the positive pole of said two-terminal impedance device having operating potential thereon negative with respect to that applied to the negative pole of said two-terminal impedance device, another series circuit substantially the same as and connected in parallel with the first said series circuit, and further impedance devices capable of passing alternating current cross-connecting unlike poles of the two-terminal impedance devices of said series circuits.

5. A multivibrator circuit arrangement including a series circuit comprising an impedance element capable of passing direct current, a germanium diode and a further impedance element capable of passing direct current, means to apply direct operating potential across said series circuit of value at which said diode exhibits a negative resistance characteristic, the positive pole of said diode having operating potential thereon negative with respect to that applied to the negative pole of said diode, another series circuit substantially the same as and connected in parallel with the first said series circuit, and further impedance devices capable of passing alternating current cross-connecting unlike poles of the diodes of said series circuits.

6. A wave translating circuit arrangement including a series circuit comprising an impedance element capable of passing direct current, a two-terminal uni-directional nonlinear impedance device and a further impedance element capable of passing direct current, means to apply direct operating potential across said series circuit of value at which said two-terminal device exhibits a negative resistance characteristic, the positive pole of said two-terminal impedance device having operating potential thereon negative with respect to that applied to the negative pole of said two-terminal impedance device, a further series circuit comprising a unilateral impedance device and at least one impedance element capable of passing direct current connected across the first said series circuit, the polarity of said unilateral impedance device being arranged in operative relationship to the polarity of potential applied to the first said series circuit, and further impedance devices capable of passing alternating current cross coupling said unilateral and said two-terminal unidirectional nonlinear impedance devices.

WILLIAM A. MILLER.

REFERENCES CITED

The following references are of record in the file of this patent:

UNITED STATES PATENTS

| Number | Name | Date |
|---|---|---|
| 1,792,781 | Thilo | Feb. 17, 1931 |
| 2,152,016 | Baesecke et al. | Mar. 28, 1939 |
| 2,219,189 | Lundstrom | Oct. 22, 1940 |
| 2,310,328 | Swift | Feb. 9, 1943 |
| 2,360,233 | Hussey | Oct. 10, 1944 |

OTHER REFERENCES

Article in Electronics, February 1946, entitled "Germanium Crystal Diodes," pages 118 through 123.